United States Patent
Sperle et al.

(10) Patent No.: US 7,302,075 B2
(45) Date of Patent: Nov. 27, 2007

(54) ELECTRONIC DEVICE WITH LOUDSPEAKER

(75) Inventors: Cornelius Sperle, Le Thoureil (FR); Gilles Bourgoin, Angers (FR); Alain Barrault, Saint Barthélémy d'Anjou (FR); Roger Restif, Saint Leger des Bois (FR); André Ros, Angers (FR)

(73) Assignee: Thomson Licensing, Boulogne-Billancourt (FR)

( * ) Notice: Subject to any disclaimer, the term of this patent is extended or adjusted under 35 U.S.C. 154(b) by 465 days.

(21) Appl. No.: 10/829,802

(22) Filed: Apr. 22, 2004

(65) Prior Publication Data

US 2004/0264728 A1 Dec. 30, 2004

(30) Foreign Application Priority Data

Apr. 22, 2003 (EP) .................................. 03290983

(51) Int. Cl.
 *H04R 25/00* (2006.01)
(52) U.S. Cl. .................. 381/386; 381/353; 381/388
(58) Field of Classification Search ............... 381/87, 381/300, 306, 332, 333, 335, 336, 353, 354, 381/386, 388, 391, 392, 189; 361/681–683, 361/686; 249/917; 379/430, 433.02
See application file for complete search history.

(56) References Cited

U.S. PATENT DOCUMENTS 5,400,408 A * 3/1995 Lundgren et al. ........... 381/306
5,689,574 A * 11/1997 Heirich et al. .............. 381/354
6,335,974 B1 1/2002 Kunimoto
6,526,150 B2 * 2/2003 Kelly et al. ................. 381/353

FOREIGN PATENT DOCUMENTS

EP 0440551 8/1991

OTHER PUBLICATIONS

Patent Abstracts of Japan, vol. 1997, No. 12, Dec. 25, 1997., & JP 9 219806 A.
Search Report for EPO Appln. No. 03 29 0983 dated Feb. 18, 2004.

* cited by examiner

*Primary Examiner*—Huyen Le
(74) *Attorney, Agent, or Firm*—Joseph J. Laks; Harvey D. Fried; Patricia Verlangieri

(57) ABSTRACT

An electronic device such as a TV set has a casing (11), a loudspeaker unit (18, 24), a first surface (21) of which faces a wall (11) of the casing. Retaining means (17) are formed in the casing so as to face a second surface (20) of the loudspeaker unit (18, 24). The loudspeaker unit (18, 24) is received between the wall (11) and the retaining means (17) of the casing, and there are at least one first vibration absorbing body (19) forming a spacer between the first surface (21) and the wall (11) and at least one second vibration absorbing body (19) forming a spacer between the second surface (20) of the loudspeaker unit and the retaining means (17).

11 Claims, 3 Drawing Sheets

ELECTRONIC DEVICE WITH LOUDSPEAKER

BACKGROUND OF THE INVENTION

The present invention relates to an electronic device comprising a loudspeaker, in particular a TV set, a radio or other types of domestic electronic equipment. When assembling such an electronic device, the mounting of the loudspeakers is more problematic than the mounting of most other components, because the way the loudspeaker is mounted has a critical influence on the quality of sound generated by the device. This quality is seriously impaired if the mounting of the loudspeaker is not firm enough to prevent the frame of the loudspeaker from trembling with respect to a support on which it is mounted, or if the support can be excited to vibrate by the sound produced by the loudspeaker. Conventionally, loudspeakers have been mounted by screwing to a support, but with this technique, it is difficult to obtain a good compromise between a loose fixation that does not prevent the loudspeaker from trembling with respect to the support and a rigid fixation that will transmit vibrations of the loudspeaker to the support.

Moreover, fixing by screws is time-consuming and is expensive to automatize. A TV set in which a loudspeaker is mounted without the use of screws is known from JP 60 043 995 A. According to this document, a loudspeaker can be mounted on a cabinet of a TV set by engaging one side of the frame of the loudspeaker behind a pawl provided at an inner surface of a baffle board. A second pawl is connected to an edge of the baffle board by the film hinge. By folding the film hinge, this second pawl can be brought into engagement with the other side of the frame of the loudspeaker, and the pawl is held in position by mounting a rear cover to the cabinet.

With the cabinet design of this document, mounting a loudspeaker is already easier and faster than by the traditional method of screwing. However, mounting the rear cover behind the baffle board may be difficult. Namely, when the film hinge has been bent in order to engage the loudspeaker, care must be taken to prevent it from unbending again, because otherwise, the loudspeaker becomes loose again, and the rear cover cannot be mounted.

A further problem is that the baffle board and the loudspeaker frame must be manufactured with narrow tolerance ranges. Namely, if the pawls are to close to each other, it may be impossible to bend the film hinges as far as necessary in order to enable the rear cover to be mounted, and if they are to far apart, the hold of the loudspeaker by the pawls may not be firm enough, so that the loudspeaker may rattle in operation.

SUMMARY OF THE INVENTION

The present invention aims to provide an electronic device in which mounting of a loudspeaker is facilitated, and a good sound quality is reliably achieved.

The invention relates to an electronic device comprising a casing, a loudspeaker unit, a first surface of which faces a first wall of the casing; retaining means formed in the casing so as to face a second surface of the loudspeaker unit. The loudspeaker unit is received between said first wall and the retaining means of the casing and there is at least one first vibration absorbing body forming a spacer between the first surface and the first wall and at least one second vibration absorbing body forming a spacer between the second surface of the loudspeaker unit and said retaining means.

By adequately selecting the width of the space between the first wall and the first surface and between the retaining means and the second surface, respectively, the rigidity and the number and/or cross section area of the vibration absorbing bodies, any desired degree of rigidity of coupling between the loudspeaker unit and the casing can be obtained reliably and reproducibly.

In order to precisely define the position of the loudspeaker unit in space, it may be supported at four points at least, so that preferably, at least four of said vibration absorbing bodies are present.

In order to easily define the position of the vibration absorbing bodies at the casing and/or at the loudspeaker unit, a recess for receiving part of such a vibration absorbing body may be provided in at least one of said first wall, said retaining means and said loudspeaker unit.

According to a possible embodiment, the loudspeaker unit comprises a hollow shell having at least one opening wherein a loudspeaker is mounted. Such a loudspeaker unit is particularly suited as a subwoofer unit.

In order for the sound to be emitted efficiently, the first wall may be an outer wall of the casing, two openings of the shell both may face this outer wall, and sound passages may be formed in regions of said wall facing said openings.

Possibly, the surface of the loudspeaker unit that faces the outer wall has at least two facets forming an obtuse angle, and one of said openings is formed in each facet.

Said first wall may form a bottom side of said casing. In particular if the loudspeaker unit is a subwoofer unit, it may be placed at this bottom side without impairing the sound quality, and other surface regions of the casing remain available for placing a CRT, treble loudspeakers, and so on, so that a very compact casing may be achieved.

In order for sound to be emitted efficiently from the bottom side of the casing, it should preferably avoid to rest flat on a support. Therefore, the first wall is preferably curved. Thus, at its inner side, a space for receiving the loudspeaker unit is formed. A prominent point at its outer side may form a resting point of the casing.

At least two more resting points may be formed by legs projecting from the body of the casing.

Naturally, the invention can be used with any type of loudspeaker enclosure, as for instance with one or more bass reflex ports, or with a sealed box or a box with one or more passive drones.

DESCRIPTION OF THE DRAWINGS

Further features and advantages of the present invention become apparent from the subsequent description of embodiments in connection with the appended drawings.

DESCRIPTION OF PREFERRED EMBODIMENTS

Figure 1:
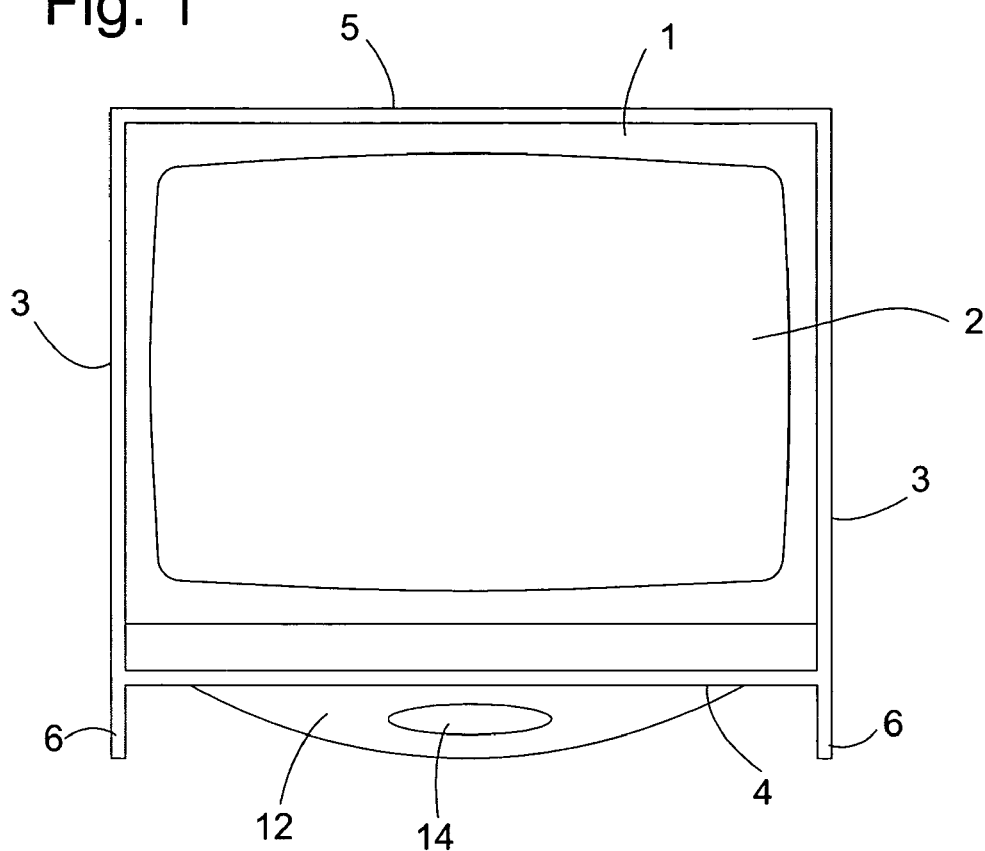
FIG. 1 is a schematic front view of a TV set according to the present invention.
Figure 2:
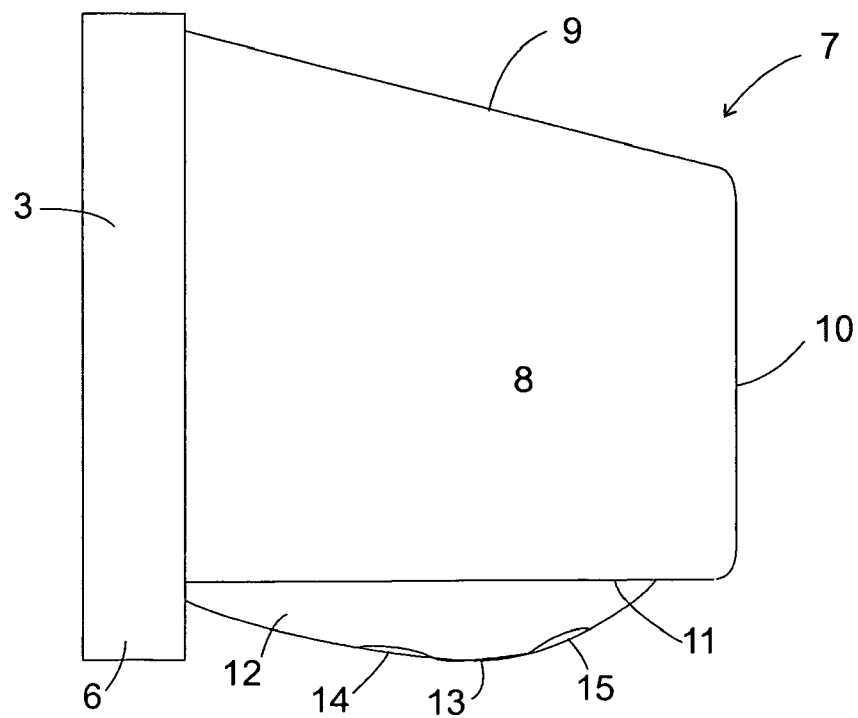
FIG. 2 is a side view of the TV set.

The TV set of FIGS. 1 and 2 has a casing assembled from a plurality of molded plastic components. There is a front frame 1 surrounding a CRT 2, an outer edge of which is formed by ribs 3, 4, 5 extending in front-rear-direction. The lateral ribs 3 protrude beyond the bottom rib 4 so as to form two feet 6 on which the casing rests.

A rear casing element 7 forming side, top and rear walls 8, 9, 10 of the casing is fixed at an inner side of ribs 3, 5; a bottom wall 11 is connected to bottom rib 4 and to a lower edge of the rear casing element 7. In the view of FIG. 2, a flat portion of this bottom wall 11 is flush with the lower edge of casing element 7 and is not to be seen; only a downwardly extending projection 12 in the bottom wall 11 is shown. The lowest point 13 of this projection is a third resting point of the casing.

The projection 12 has two sound passages 14, 15, one, 14, facing to the front and other, 15, to the rear. Each of these passages is formed by a plurality of parallel slits.

Figure 3:
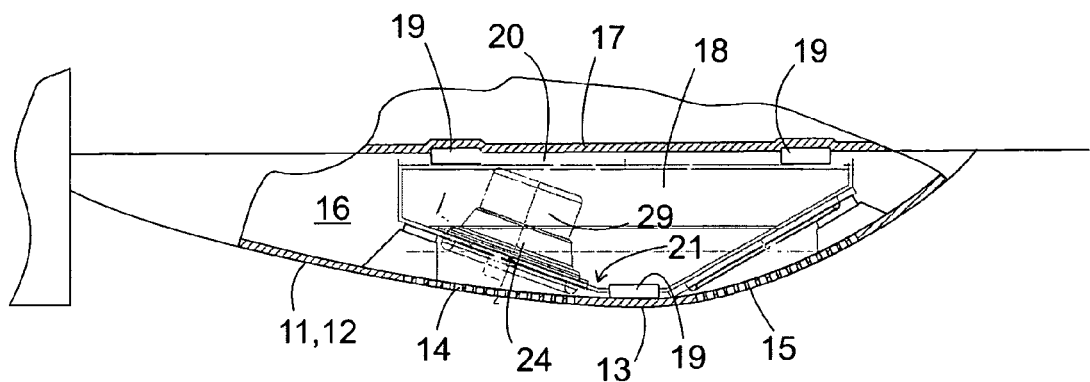
FIG. 3 is a partial cross section of the bottom region of the TV set.

FIG. 3 is an enlarged detail of the bottom region of the TV set, partly cut open so as to show the structure inside the projection 12 of bottom wall 11. In a space 16 between the bottom wall 11 and a horizontal partition wall 17, a hollow plastic shell 18 is held in place by a plurality of buffers 19 formed of a soft, resilient material. Two of these buffers 19 are engaged in recesses of the partition wall 17, on the one hand, and of a top surface 20 of the shell 18, on the other. Another buffer 19 is placed between the lowest point 13 of the bottom wall 11 and a center of bottom surface 21 of a shell 18. More buffers 19 are sandwiched between lateral facets 22, 23 of the bottom surface 21 and inward projections of the bottom wall 11.

The front facet 22 of bottom surface 21 has an opening in which a loudspeaker 24 is placed. A rear side of the loudspeaker 24 communicates with another opening 25 in the rear facet 23. The openings are placed facing front and rear sound passages 14, 15 of the bottom wall 11, respectively.

Figure 4:
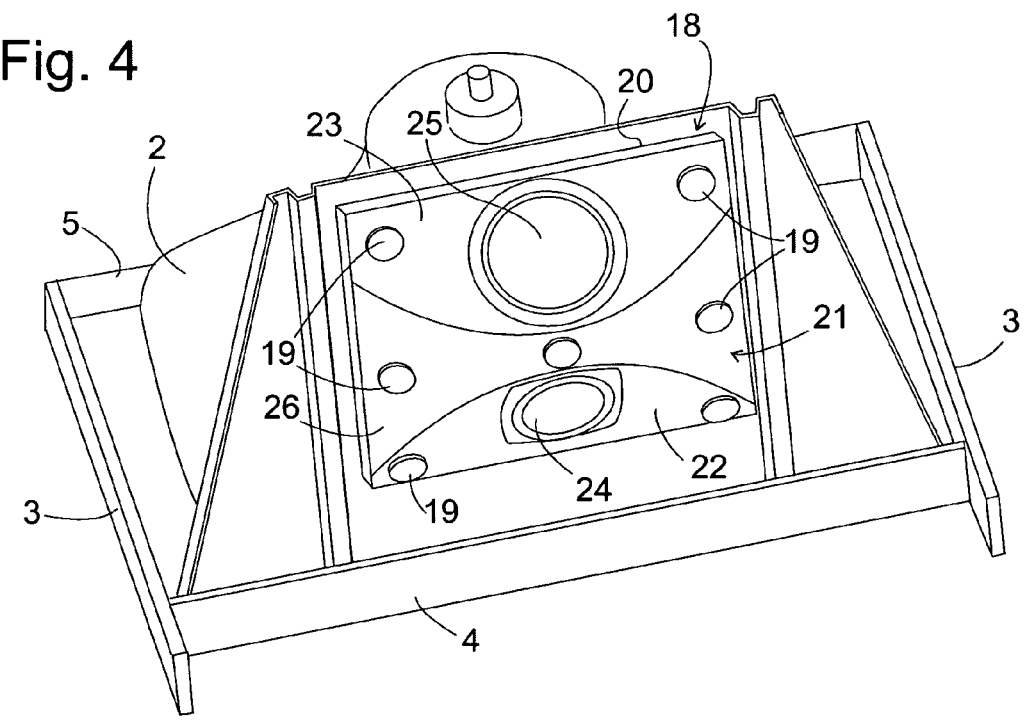
FIG. 4 is a perspective view of the TV set, seen from the bottom, with its outer wall removed.

FIG. 4 is a perspective view of the TV set, with the rear casing element 7 and the bottom wall 11 removed, seen from the bottom side. In this view, the loudspeaker unit formed of the shell 18 and the loudspeaker 24 is clearly visible. It is noted that the bottom surface 21 has three facets, the flat front and rear facets 22, 23 and a third facet 26 which is curved so as to fit to the curvature of the projection 12 of the bottom wall 11, so that the three buffers 19 shown on the curved facet 26 come into direct contact with the bottom wall 11, once installed, and are slightly compressed between it and the shell 18. Each of the flat facets 22, 23 has two buffers 19. Between the top surface 20 and the partition wall 17, there are four buffers, not shown in the Figure, at locations roughly above the buffers 19 of the flat facets 22, 23.

Figure 5:
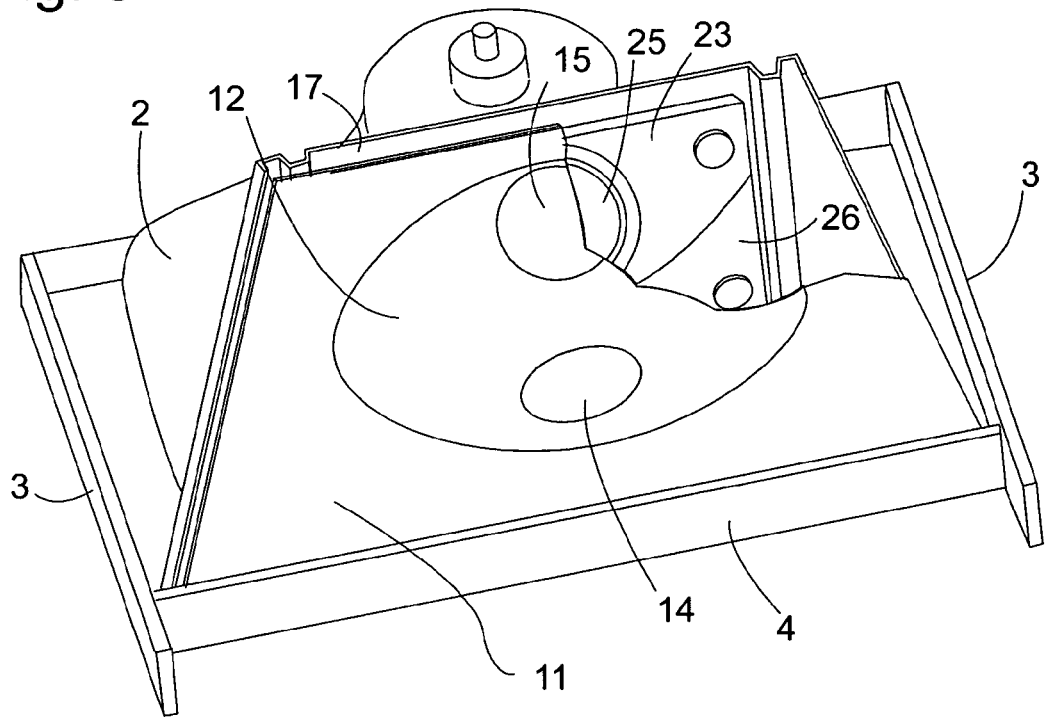
FIG. 5 is another perspective view of the TV set with its bottom wall in place, but partly cut away.

FIG. 5 shows the TV set from the same point of view as FIG. 4, but with the bottom wall 11 in place. One corner of the bottom wall is cut away so as to show its arrangement with respect to the loudspeaker unit.

Figure 6:
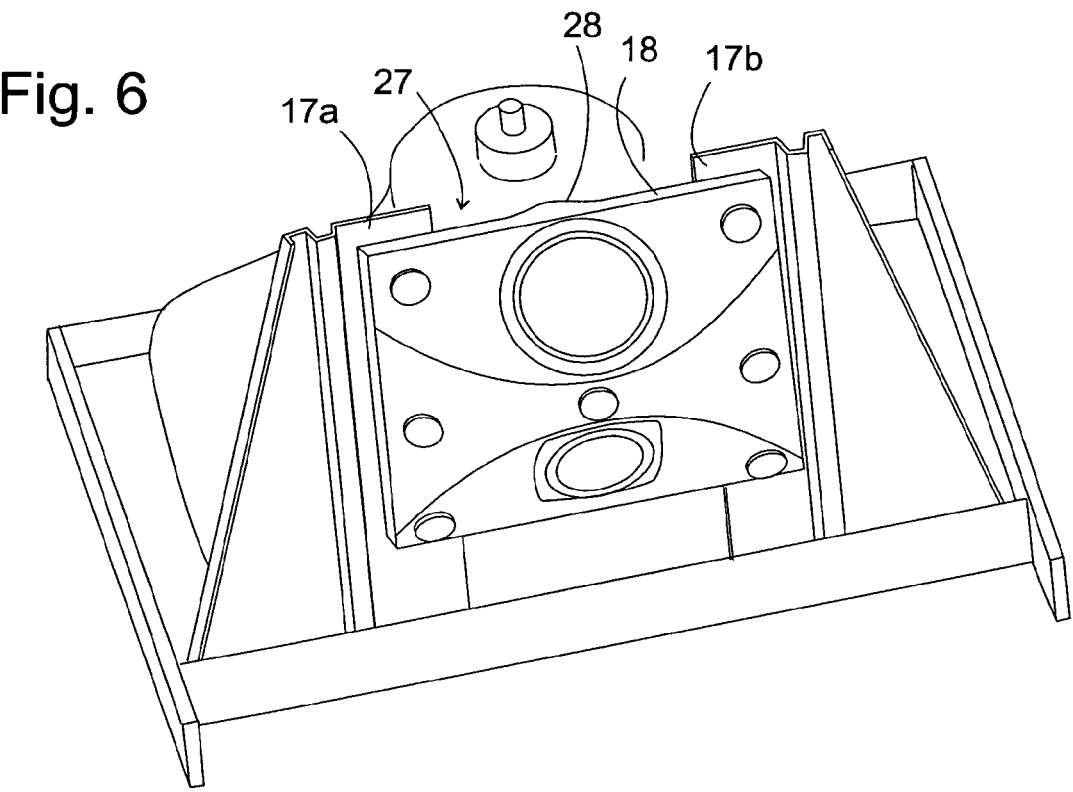
FIG. 6 is a perspective view of a modified embodiment of the TV set.

FIG. 6 is a perspective view analogous to that of FIG. 4 of a slightly modified embodiment. Here, the partition wall is reduced to two webs 17a, 17b extending from front to rear, with a broad gap 27 formed in between. This gap allows for an upward projection 28 of top surface 20 to extend into the gap 27. By having the solenoid 29 (see FIG. 3) of the loudspeaker 24 engage inside this outward projection 28, the space 16 between the webs 17a, 17b and the bottom wall 11 may be made flatter, so that the casing may be made very compact.

What is claimed is:

1. An electronic device comprising
a casing;
a loudspeaker unit that comprises a loudspeaker and a hollow shell, a first surface of which faces a first wall of the casing;
retaining means formed in the casing so as to face a second surface of the hollow shell;
wherein the hollow shell is received between said first wall (11) and the retaining means of the casing, at least one first vibration absorbing body forming a spacer between the first surface and the first wall and at least one second vibration absorbing body forming a spacer between the second surface of the hollow shell and said retaining means.

2. The electronic device of claim 1, comprising at least four of said vibration absorbing bodies.

3. The electronic device of claim 1, wherein a recess for receiving part of a vibration absorbing body is provided in at least one of said first wall (11), said retaining means and said hollow shell.

4. The electronic device of claim 1, wherein said hollow shell has at least one opening wherein the loudspeaker is mounted.

5. The electronic device of claim 1, wherein the first wall is an outer wall of the casing, wherein two openings face said wall, and wherein sound passages are formed in said wall corresponding to said openings.

6. The electronic device of claim 5, wherein the surface facing the outer wall has at least two facets forming an obtuse angle, and wherein one of said openings is formed in each facet.

7. The electronic device of claim 1, wherein said first wall forms a bottom side of said casing.

8. The electronic device of claim 7, wherein the first wall is curved so as to form, at its inner side, a space for receiving the loudspeaker unit and, at its outer side, a resting point of the casing.

9. The electronic device of claim 8, wherein at least two more resting points are formed by legs projecting from the body of the casing.

10. The electronic device of claim 1, wherein the loudspeaker unit is a subwoofer unit.

11. The electronic device of claim 1, wherein the device is a TV set.

* * * * *